United States Patent [19]

Drake et al.

[11] 3,850,603

[45] Nov. 26, 1974

[54] TRANSIENT ELECTRIC POTENTIAL DIFFERENCE IN GLASS BY ELECTRIC FIELD COOLING

[75] Inventors: Cyril F. Drake; Ian F. Scanlan, both of Harlow, England

[73] Assignee: International Telephone and Telegraph Corporation, Nutley, N.J.

[22] Filed: Nov. 15, 1973

[21] Appl. No.: 416,126

Related U.S. Application Data

[63] Continuation-in-part of Ser. No. 221,038, Jan. 26, 1972, abandoned, which is a continuation-in-part of Ser. No. 48,765, May 5, 1970, abandoned.

[30] Foreign Application Priority Data
June 9, 1969  Great Britain ................... 29063/69

[52] U.S. Cl. ...................... 65/30, 65/117, 106/47 R
[51] Int. Cl. ............................................ C03c 15/00
[58] Field of Search .... 65/30, 117; 106/47 Q, 47 R; 252/62.9

[56] References Cited

UNITED STATES PATENTS

| | | | |
|---|---|---|---|
| 3,020,238 | 2/1962 | Munakata et al. ................ | 106/47 R |
| 3,218,220 | 11/1965 | Weber ................................ | 65/30 X |
| 3,271,591 | 9/1966 | Ovshinsky ......................... | 106/44 R |
| 3,440,588 | 4/1969 | Drake et al. ...................... | 106/47 R |
| 3,627,491 | 12/1971 | Boffe et al. ........................ | 65/30 |
| 3,639,114 | 2/1972 | Loukes .............................. | 65/30 |
| 3,681,040 | 8/1972 | Jean-Marc et al. ................ | 65/30 |
| 3,681,041 | 8/1972 | D'Huart ............................. | 65/30 |
| 3,730,696 | 5/1973 | Pointu et al. ...................... | 65/30 |
| 3,764,491 | 10/1973 | Schwartz ........................... | 65/30 |

*Primary Examiner*—S. Leon Bashore
*Assistant Examiner*—Frank W. Miga
*Attorney, Agent, or Firm*—John T. O'Halloran; Menotti J. Lombardi, Jr.; Vincent Ingrassia

[57] ABSTRACT

Glass is rendered pyroelectric by cooling it through transformmation temperature to at least 100°C below its transformation temperature while applying an electric field of at least 100 volts/cm to said glass.

1 Claim, No Drawings

TRANSIENT ELECTRIC POTENTIAL DIFFERENCE IN GLASS BY ELECTRIC FIELD COOLING

CROSS REFERENCES TO RELATED APPLICATIONS

This is a continuation-in-part of co-pending Application Ser. No. 221,038, filed Jan. 26, 1972 now abandoned, entitled "Improvements in or Relating to Glasses," which is a continuation-in-part application of Application Ser. No. 48,765, filed May 5, 1970 now abandoned, entitled "Glasses."

BACKGROUND OF THE INVENTION

This invention relates to glass and in particular to the manufacture of pyroelectric glass.

Pyroelectric crystalline materials are well known, and indeed it is possible to tell whether a particular crystal is pyroelectric or not simply by reference to its crystalline structure. Thus, of the twenty-one classes of crystals which lack a center of symmetry ten constitute classes of pyroelectrics. This invention discloses how the necessary asymmetry to provide a pyroelectric effect may be locked-in in a glass.

SUMMARY OF THE INVENTION

It is an object of this invention to render a glass composition pyroelectric.

According to a broad aspect of this invention there is provided a method of making a pyroelectric glass including the step of cooling a glass from its glass transformation temperature to at least 100°C below its annealing temperature while maintaining it in an electric field of at least 100 v/cm.

A feature of the invention resides in fact that the glass consists of at least in part an oxide glass-forming material, and one or more glass modifying oxides of elements selected from Group II A and Group II B of the periodic table.

The invention also resides in devices, in particular radiation detectors and semiconductor devices, incorporating a pyroelectric glass.

DESCRIPTION OF THE PREFERRED EMBODIMENTS

Glasses contain molecular structures having permanent electric dipole moments. The particular types of structure vary from glass to glass. In a mass of glass which has been cooled from the melt without any special treatment the individual dipoles will be randomly oriented, and there will in consequence be no total dipole moment. At room temperature the dipoles are not rotatable by an applied electric field because they lie in potential wells having activation energies much larger than kT (the product of Boltzmann's Constant with Absolute Temperature) of room temperature. All glasses show a transformation temperature Tg above which they behave like very viscous liquids. Structural reorientations become possible at or above this temperature. At this temperature kTg is comparable with the activation energies of the electric dipoles.

According to the method of the present invention, an electric field is applied at or above Tg and a considerable number of the dipoles reorient themselves to align with the applied field. The applied field is maintained while cooling the glass well below Tg. In this way the dipoles once again become locked in position as kT reverts to a value much smaller than the activation energies of the dipoles. In the two directions at right angles to the direction of the applied field the glass is still disordered, but the glass now has a polar axis in the direction along which the field was applied. This is the asymmetry referred to above.

Any material that has a permanent electric dipole moment is pyroelectric. The dipole moment of such a material is normally masked by surface charge. In the neighborhood of its poles the material collects from the ambient a sufficient charge to neutrailize its dipole moment. If such a material is heated the resulting dimensional changes will cause a change in its dipole moment. (Other factors, such as change of dielectric constant with temperature, may also contribute to this change of dipole moment.) Therefore, whenever there is a change of temperature the amount of surface charge requires adjustment to restore electrical equilibrium with the ambient. This adjustment is not instantaneous, and until it is complete there is an electric potential difference between the ends of the material. Thus an effect of a temperature change upon this type of material is to produce a transient electric potential difference, hence the term "pyroelectric".

It is thought that an oxide glass based on phosphorus pentoxide will provide the greatest pyroelectric effect on account of its greater polarizability compared with other glass forming oxides. For some applications however it may prove too soft. The addition of glass modifying elements chosen from Group II A or Group II B of the periodic table has been found to enhance greatly the magnitude of the pyroelectric effect, and for this purpose oxides of calcium and cadmium are preferred.

A typical glass composition which can be rendered pyroelectric consists of 52.4 mole % ZnO — 47.6 mole % $P_2O_5$. This glass can be prepared by mixing the constituents in powder form and then heating them in a glazed porcelain crucible for one-half hour in a muffle furnace held at 1,300°C, after which the resulting fused mass can be annealed.

The transformation temperature Tg of any given specific glass composition is a constant specific to that composition. While annealing is not really germane to the present invention, one would normally anneal the glass, rather than suddenly quench it, for the reason one normally anneals glass, namely to prevent setting up unduly large internal mechanical stresses. The rate of reorientation of dipoles under the influence of an applied electric field can be expected to be exponentially dependent upon temperature since it depends upon the relative magnitude of kT and their activation energies. Typically, the electric field is applied for ten minutes before the cooling process is begun.

A sample of this glass in the form of a 1 cm² plate 1 mm thick can be sandwiched between two aluminum electrodes and heated to 400°C. A potential of 500 volts can then be applied across the electrodes, and the plate can be cooled at about 1°C per minute to room temperature with the field applied.

This process provides the glass with a stored charge of about $1 \times 10^{-6}$ coulombs/sq.cm. This stored charge can be measured by connecting the electrodes together and determining the integral of the current flow resulting from releasing all the stored charge by heating the plate up to 400°C again.

It is not necessary to maintain to room temperature the applied field when cooling the glass, but it should be maintained, preferably at least, till 100°C is reached, at which temperature (if maintained) it has been calculated that the stored charge would have a half-life of $10^{12}$ seconds. (At lower temperatures the half-life is correspondingly greater.)

There is no restriction upon the rate at which the glass must be cooled while the field is applied other than that set by mechanical considerations, it being necessary to avoid excessive strain arising from very rapid quenching.

The quoted field strength of 5,000 volts/cm is an arbitrarily chosen one; fields in excess of this could well be employed as this value is nowhere near the ultimate field strength of the material (greater than $3 \times 10^6$ v/cm), qualitative effects have been observed at smaller fields such as 100 volts/cm.

Another typical glass composition which is suitable for making into a pyroelectric glass consists of 25% $Na_2O$ 20% $CaO$ and 55% $P_2O_5$. This composition can have as little as 5 mole percent of $CaO$ with equally good results.

A plate of this material can be made pyroelectric by poling it with an electric field while it is at its transformation temperature and then cooling it while maintaining the field so that the polarization becomes locked in and remains even when the applied field is removed. Preferably the electric field is applied between two electrode layers covering the major surface of the plate. Typically a field strength of the order of $10^4$ v/cm is required while the plate is cooled from above 200°C to below 70°C, though the actual value of the field needed will depend upon the value of the polarization that is required.

The term "glass transformation temperature" is a term well known in the art and reference is made to a standard textbook "The Properties of Glass," by George W. Morey, Reinhold Publication Corporation, New York, 1938, and in particular to page 172, where the following definition is given: "The transformation temperature $T_o$ corresponds ... to a viscosity from $10^{13} - 10^{14}$ poise". Glass transformation temperature is also referred to in the above-identified reference on page 267, Figure XI 3.

Since the pyroelectric effect is produced in the glass by a form of quenching it can be subsequently destroyed by heating. Therefore, glasses with higher transformation temperatures will be suitable for applications involving relatively high ambient temperatures. To this end the glass composition referred to above may be modified by the addition of 10% $SiO_2$ or $GeO_2$ in place of some of the $P_2O_5$ so that the concentration of $P_2O_5$ is reduced from 55 to 45 percent thereby effecting an increase in its transformation temperature at the expense of a slight diminution of the pyroelectric effect.

One application of a pyroelectric glass is in radiation detectors where a direct substitution can be made of a glass pyroelectric for one of the previously known crystalline pyroelectrics. Another application is in insulated gate field effect transistors.

The simple theory of the mode of operation of an insulated gate field effect transistor would appear to indicate that the device should have a zero pinch-off voltage. This can be deduced by considering for example an FET made of $p$—type material and having $n +$ type regions for the source and drain. As soon as the gate of such a device is made marginally positive with respect to the source, charges will be attracted toward the insulating layer. Since, in theory, the number of majority carriers existing in a portion of the semiconductive material is proportional to the volume of that portion whereas the charge attraction is a surface effect depending upon any potential difference between the source and the drain, it will be evident that at least in theory any potential difference of the appropriate sense should be sufficient to cause the creation of an inversion layer. This is equivalent to the statement that the pinch-off voltage should in theory be zero. In practice however, the pinch-off voltage is generally found to be a reverse bias of several volts, and this has been attributed to the formation of charge traps at the interface between the semiconductive material and the insulating layer underlying the gate electrode during the deposition of this layer. The pinch-off voltage may then be viewed as the voltage which will cause just sufficient charge attraction from the bulk semiconductive material to neutralize all the traps at the interface.

The use of a pyroelectric glass as the insulating layer of the FET can now be seen to afford an alternative method of neutralizing the traps. In this case the glass is poled in such a way as to provide just sufficient spontaneous polarization to cause sufficient charge attraction from the bulk semiconductive material to neutralize all the traps without the application of any potential difference between the source and the gate. In this way the pinch-off voltage is artificially set to zero. Of course it is not necessary for the pyroelectric to be poled to the exact extent to provide the appropriate spontaneous polarization required to compensate exactly the pinch-off voltage resulting from charge traps, and so an insulated gate FET with a pyroelectric glass insulator can have its pinch-off voltage tailored within a certain limited range to suit the particular application for which it is intended.

Normally the insulating layer of an insulating gate FET is a layer of silica. This is a glass, and so in pinciple could be rendered pyroelectric. However, the transformation temperature is so high as to make it quite unsuitable for poling when in situ on a semiconductor device.

Instead of glass with a much lower transformation temperature has to be used in its place. Either of the last two glass compositions referred to above are suitable, though a preferred composition employs $P_2O_5$ as the glass forming oxide to which is added $CaO$ or $CdO$ as a glass modifying oxide. One method of depositing the glass on the semiconductive material consists of using water or any other suitable liquid to form a slurry of finely divided powder obtained from a previously prepared bulk sample of glass of the appropriate composition, of coating the semiconductor with a layer of the slurry and then heating it to a temperature sufficient to cause the powder particles to fuse together. Alternatively a glass layer could be formed by vapor phase deposition in a glow discharge or by depositing a thin layer of the metallic constituents of the glass on the semiconductor and then converting these constituents to a glass by heating them in a stream of oxygen carrying the glass forming oxide.

Next a temporary or permanent upper electrode layer is applied to the surface of the glass layer and then the glass is poled by heating the device up to the transformation temperature of the glass and subsequently allowing it to cool while maintaining an applied electric field of the appropriate sign and magnitude.

It is to be understood that the foregoing description of specific examples of this invention is not to be considered as a limitation of its scope.

We claim:

1. A method of producing a transient electric potential difference in a glass comprising:

heating a mixture of 25 mole percent of $Na_2O$, 20 mole percent of CdO or CaO, 10 mole percent of $GeO_2$ or $SiO_2$, and 45 mole percent of $P_2O_5$ in a muffle furnace held at 1,300° C;

forming a one square centimeter plate of said glass having a thickness of 1mm;

heating said glass to its transformation temperature; and cooling said glass from its glass transformation temperature to at least 100° C below its annealing temperature, while applying an electric field of 500 volts/$cm^2$ to said glass plate resulting in structural reorientation of the electric dipoles in the glass.

* * * * *